March 29, 1927.
R. R. FREUND
1,622,437
LENS SUPPORTING AND RETAINING MEANS
Filed Feb. 18, 1924
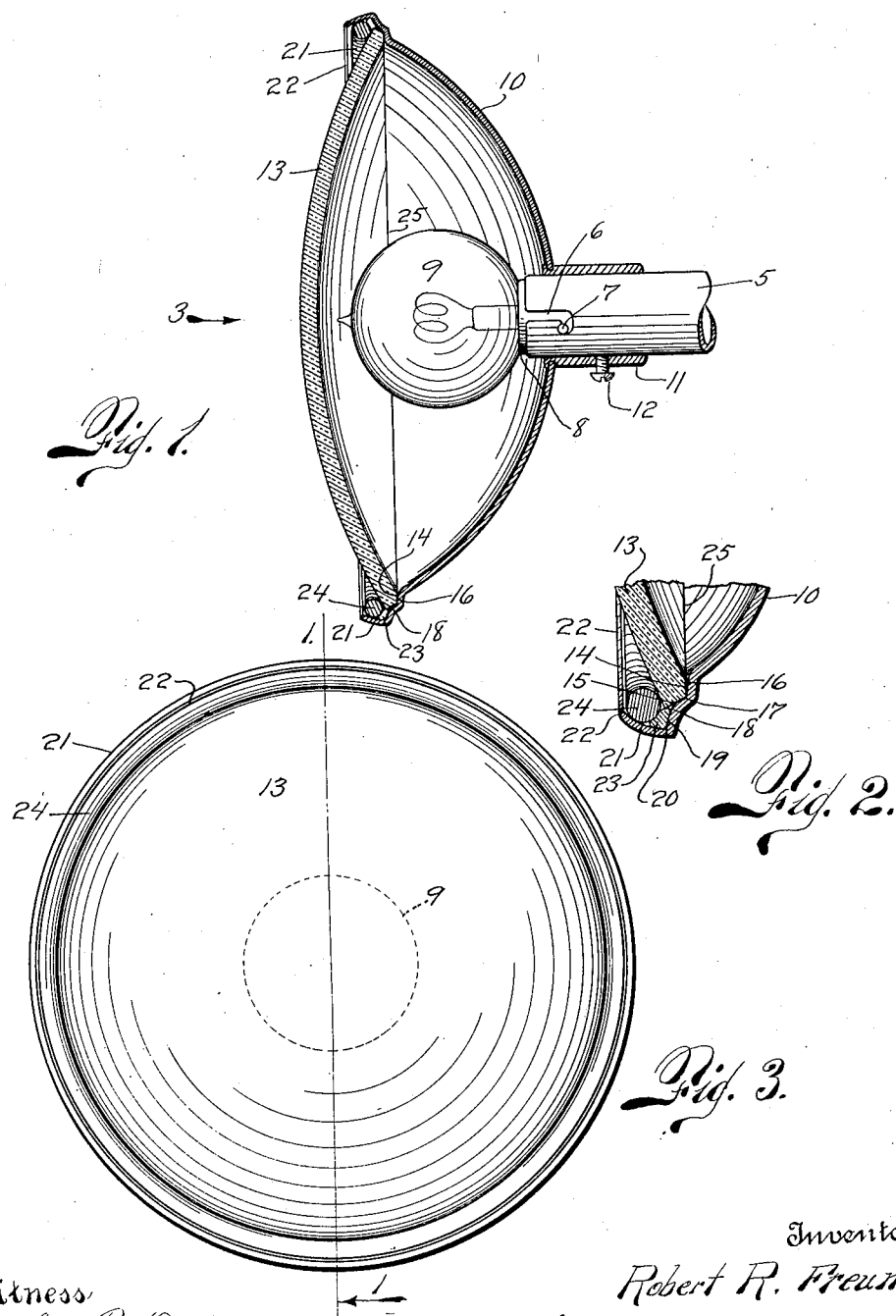
Witness
John B. Dade.
Inventor
Robert R. Freund.
by Wilkinson & Giusta
his Attorneys Patented Mar. 29, 1927.

1,622,437

UNITED STATES PATENT OFFICE.

ROBERT R. FREUND, OF DENVER, COLORADO, ASSIGNOR TO SHOT-LITE CORPORATION OF AMERICA, OF DENVER, COLORADO, A CORPORATION OF COLORADO.

LENS SUPPORTING AND RETAINING MEANS.

Application filed February 18, 1924. Serial No. 693,657.

This invention relates to lens supporting and retaining means for the closure lights or lenses of lanterns or lamps.

While in its preferred adaptation, perhaps, the invention more particularly embodies improvements in means for detachably mounting and firmly securing, against relative displacements in all directions, the closure lenses of electric projector lights, such as the spotlights, headlights, or projector lights, for automotive vehicles, or for vehicles of other types whether land, marine or aerial, still it will be obvious that the same principles are involved relatively to various other forms of lanterns, such as headlights, searchlights and projector lights in general, whether of an electrical character or otherwise, and even to lamps or lanterns that are not necessarily projector lights, such as tail lights or other signaling lamps.

It is to be understood at the outset, therefore, that, although for simplicity and brevity I shall disclose the improvements more particularly with relation to spotlights, the real invention itself is not necessarily to be restricted in practice to any one special sphere of usefulness.

It has heretofore been proposed, in avoidance of more complex means, to simply mount and secure these lenses in place by inserting and seating the same within an internally channeled or deep grooved rim disposed annularly of the open front of the lamp, relatively to its casing or to the parabola reflector contained therein or to the reflector element alone when, as is the case with spotlights, there need be no outer casing therefor, and to then clamp the said lens in place by means of a springy split ring, or the like, also inserted within the said annular groove of said rim forwardly of the lens and generally in association with a cushioning gasket element.

In other words both lens and springy split ring are disposed in the same identical receiving groove, which has an outer inturned overhanging annular lip for holding the split ring in place, when sprung into said groove. Hence, the diameter of the said annular groove must be substantially larger than the diameter of the opening of said inturned annular lip, whereas the diameter of the lens must be substantially less than the diameter of said annular groove, in order that the lens may be inserted through the said opening of the said overhanging annular lip. It accordingly follows that the lens itself is displaceable in its own plane, within said containing annular groove, or has bodily play in a plane at right angles to its axial line.

Not infrequently, therefore, the aforesaid gasket, previously referred to as being generally used, or the springy split ring itself, will be cramped or crowded into a portion of the space lying peripherally between the edge face of the lens and its containing annular groove, thus forcing the lens edgewise out of proper adjustment, which is very objectionable for many and obvious reasons.

A primary object of my improvements is to completely overcome the possibilty of edgewise or planetary displacement of the lens, when seated in its containing groove, and likewise to prevent the possibility of any improper crowding or distorted disposition of either the said gasket or springy split ring, or any tendency to become so cramped or distorted, whereby there will be effected not only the properly aligned mounting of the lens, but also its said proper attachment will be assured more economically and facilely, both in point of time and labor.

The foregoing as well as other objects and advantages, however, including compactness in combined structure and comparatively small costs of production and assembly, and the manner of accomplishing the desired ends, will be so clearly apparent, it is believed, as incidental to the following disclosure, that no useful purpose would be served by further enlarging upon the same. With these prefacing remarks, therefore, reference will now be immediately had to the accompanying drawings, illustrating a practical embodiment of the improvements, in which drawings—

Figure 1 is a central longitudinal sectional view through a spotlight device, which, in so far as my invention is concerned, might be any other appropriate form of light, lamp, or lantern;

Figure 2 is an enlarged fragmentary analogous view, through the lens, its reflector casing support, and the means for mounting and retaining the same in combined relation; and Figure 3 is a front elevational view, or looking towards the arrow 3 of Figure 1.

The numeral 5 designates a hollow open-ended barrel or tubular arm support, having the usual forward end slots 6 for the locking reception of the lateral pins or pintles 7 of an electric lamp base 8, the said lamp being indicated at 9.

10 indicates the concave reflector, which ordinarily is the only casing for lamps of the spotlight type, and this is illustrated as being mounted on the forward end of the barrel 5 by means of the interposed sleeve 11, having a set screw 12 as the securing means therefor.

13 designates the usual concavo-convex lens, which is ordinarily ground with the flat plane annular inner surface 14 and the continuing beveled peripheral surface 15.

The reflector element 10, or its equivalent, is provided at its open front with an annular internally grooved rim which in fact, however, is formed with two separate annular seating recesses or channels, the one being entirely independent of the other, in one sense of the word at least, although directly opening thereto in coacting merged relation.

The inner of said recesses is formed by an outwardly turned flange or annular seating ledge face 16 and a flaring annular face 18, shown as being of forwardly bulging or convexly arcuate transverse formation, the merger line of the faces 16 and 18 providing a well defined obtuse angle 17, extending annularly therebetween, and the said annular ledge face 16 lying approximately in a plane, indicated at 25, that is disposed at right angles to the axis of the lens, which plane 25 also approximately represents the inner annular plane surface 14 of the lens, when the latter is mounted in seated relation with the reflector casing 10.

The surface 18 is more or less extended, relatively to the surface 16, or continues as at 19 to approximately a position, indicated by the annularly disposed acute angle 20, which is substantially distant outwardly from the seating face 18, and from which angular position 20 the rim is formed with a forwardly convergent annular lip 21, that is shown as providing a transverse concavely arcuate wedging internal seating face, terminating in the annular outer opening 22.

It will be observed, therefore, that the longest diameter of the inner recess 16—17—18 is substantially less than the longest diameter of the outer recess 19—20—21, and approximately less than the minimum diameter of the outer recess which is the diameter of the external opening 22 of the rim, the said inner recess being adapted to snugly seat the peripheral edge faces 14—15 of the lens 13, to prevent any edgewise displacement of the latter, whereas the outer recess is adapted to firmly seat a gasket 23 and a springy retaining split ring element 24, for holding the lens firmly against axial displacement.

It is believed that the manner of assembling, seating and combined functioning of the whole arrangement will be self-evident from the drawings and foregoing description, but may be further briefly stated as follows:—

The lens 13, being of approximately the same diametric measurement as the inner recess 16—17—18, will not only freely pass through the opening 22 of the rim, but its peripheral faces will also be seated snugly within and against the walls of said inner recess, independently of the aforesaid outer recess, with no substantial peripheral space therebetween, for the crowding in of the gasket or retaining ring, or otherwise permitting of edgewise displacement.

The gasket 23, of suitable compressible substance, is then inserted within the outer annular recess, after which the retaining split ring 24 is sprung into place, when it will be apparent that the forwardly convergent wedging surface of the annular lip 21, which wedging surface is shown as concavely curving, will cause this resilient retaining ring to hold the lens firmly seated, against axial displacement, within its own inner recess seating the same separately of the outer recess, any tendency of undue pressure by the ring upon the lens, however, being compensated for by the cushioning action of the gasket element 23, which becomes more or less compressed as it is forced or packed within the annularly extending extreme corner angle, of the recessed rim, whose apex is at the position 20.

While I have thus fully set forth the invention, it will nevertheless be understood that I do not confine myself necessarily to the exact details as disclosed, excepting as they may come within the terms or tenor of the claim, or equivalent features, or as when fairly interpreted in the light of the specification if necessary.

What I do claim, as new and patentable, is:—

A lamp comprising a casing that has an open face encompassed by an enlarged seating rim which in cross-section embodies an annular outwardly turned flange section, having an approximately plane face, merging into a forwardly divergent intermediate annular section, having a bulging convexly arcuate forwardly disposed face, and a continuing forwardly converging concavely arcuate annular lip section that provides for a wedging face, the said plane face and a portion of said convexly arcuate face forming an obtuse angular inner annular recess while the other portion of said convexly arcuate face and the said concavely arcuate wedging face form an acute angular outer annular recess, with the minimum diameter of said outer recess being slightly greater than the maximum diameter of said inner recess, an annular lens peripherally seated snugly within said inner recess, an annular cushioning gasket seated within the angle of said outer recess, and a resilient ring seated within the forward portion of said outer recess in wedgingly held engagement with said cushioning gasket and said lens.

In testimony whereof, I affix my signature.

ROBERT R. FREUND.